US010686388B2

(12) United States Patent
Gonthier et al.

(10) Patent No.: US 10,686,388 B2
(45) Date of Patent: Jun. 16, 2020

(54) RECTIFYING BRIDGE CONTROL CIRCUIT

(71) Applicants: STMicroelectronics (Tours) SAS, Tours (FR); STMicroelectronics S.r.l., Agrate Brianza (MB) (IT)

(72) Inventors: Laurent Gonthier, Taipei (TW); Roberto Larosa, Catania (IT); Giulio Zoppi, Palermo (IT)

(73) Assignees: STMicroelectronics (Tours) SAS, Tours (FR); STMicroelectronics S.r.l., Agrate Brianza (MB) (IT)

( * ) Notice: Subject to any disclaimer, the term of this patent is extended or adjusted under 35 U.S.C. 154(b) by 0 days.

(21) Appl. No.: 16/362,939

(22) Filed: Mar. 25, 2019

(65) Prior Publication Data

US 2019/0222136 A1    Jul. 18, 2019

Related U.S. Application Data

(62) Division of application No. 14/956,543, filed on Dec. 2, 2015, now Pat. No. 10,284,107.

(30) Foreign Application Priority Data

Apr. 7, 2015   (FR) ..................... 15 52983

(51) Int. Cl.
*H02M 7/06*  (2006.01)
*H02M 1/08*  (2006.01)
(Continued)

(52) U.S. Cl.
CPC .............. *H02M 7/06* (2013.01); *G05B 19/10* (2013.01); *H02M 1/08* (2013.01); *H02M 1/36* (2013.01);
(Continued)

(58) Field of Classification Search
CPC ............ H02M 7/06; H02M 1/08; H02M 1/36; H02M 7/062; H02M 1/32; H02M 7/515;
(Continued)

(56) References Cited

U.S. PATENT DOCUMENTS 4,400,755 A * 8/1983 Lezan ................ H03K 17/0824
361/91.6
4,658,199 A    4/1987 Hoffman
(Continued)

FOREIGN PATENT DOCUMENTS

CN    101982934 A    3/2011
CN    205283396 U    6/2016
(Continued)

OTHER PUBLICATIONS

Chinese Office Action and Search Report for co-pending CN Appl. No. 201510846181.4 dated Jul. 16, 2018 (7 pages).
(Continued)

*Primary Examiner* — Shahed Ahmed
(74) *Attorney, Agent, or Firm* — Crowe & Dunlevy

(57) ABSTRACT

An AC/DC converter includes a first terminal and a second terminal to receive an AC voltage and a third terminal and a fourth terminal to deliver a DC voltage. A rectifying bridge is provided in the converter. A controllable switching or rectifying element has a control terminal configured to receive a control current. A first switch is coupled between a supply voltage and the control terminal to inject the control current. A second switch is coupled between the control terminal and a reference voltage to extract the control current. The first and second switches are selectively actuated by a control circuit.

19 Claims, 3 Drawing Sheets

(51) Int. Cl.
  *H02M 1/36* (2007.01)
  *H02M 7/162* (2006.01)
  *G05B 19/10* (2006.01)

(52) U.S. Cl.
  CPC ......... *H02M 7/062* (2013.01); *H02M 7/1623* (2013.01); *G05B 2219/21013* (2013.01)

(58) Field of Classification Search
  CPC .......... G05B 19/10; G05B 2219/21013; H05B 33/0887; H05B 39/044; H05B 37/0281
  See application file for complete search history.

(56) References Cited

U.S. PATENT DOCUMENTS

| | | | |
|---|---|---|---|
| 4,811,189 A | 3/1989 | Harvest et al. | |
| 5,013,993 A | 5/1991 | Bhagwat et al. | |
| 5,287,263 A * | 2/1994 | Shilo | H02H 9/001 323/908 |
| 5,822,203 A | 10/1998 | Peron | |
| 5,831,349 A * | 11/1998 | Weng | H02M 5/2573 307/125 |
| 6,018,473 A | 1/2000 | Claassen | |
| 2012/0026761 A1 * | 2/2012 | Young | H02M 7/125 363/44 |
| 2018/0103520 A1 | 4/2018 | Zhu et al. | |

FOREIGN PATENT DOCUMENTS

| | | |
|---|---|---|
| FR | 2038643 | 1/1971 |
| FR | 2742013 A1 | 6/1997 |
| GB | 1310937 | 3/1973 |
| JP | 2010125752 A | 6/2010 |
| JP | 4959008 B1 | 3/2012 |

OTHER PUBLICATIONS

EP First Office Action for co-pending EP Appl. No. 15193593.9 dated Jul. 3, 2017 (9 pages).

EP Search Report and Written Opinion for co-pending EP Appl. No. 15193593.9 dated Aug. 19, 2016 (9 pages).

First Office Action and Search Report for co-pending Chinese Appl. No. 201510846181.4 dated Jan. 2, 2018 (7 pages).

INPI Search Report and Written Opinion for FR 1552983 dated Feb. 11, 2016 (9 pages).

* cited by examiner

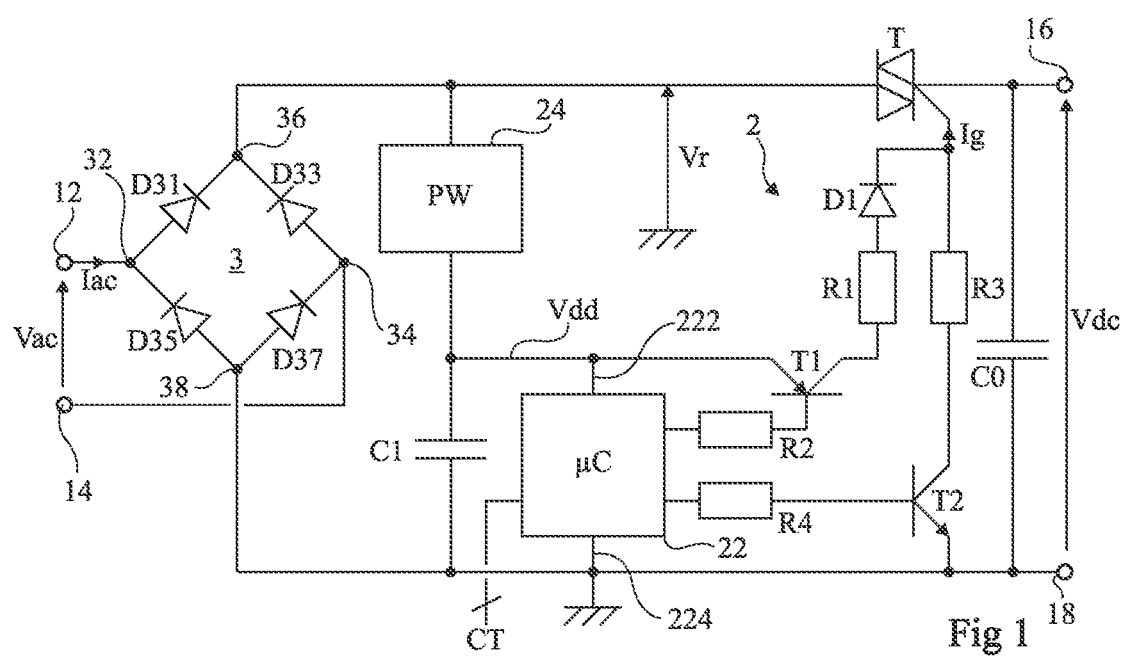
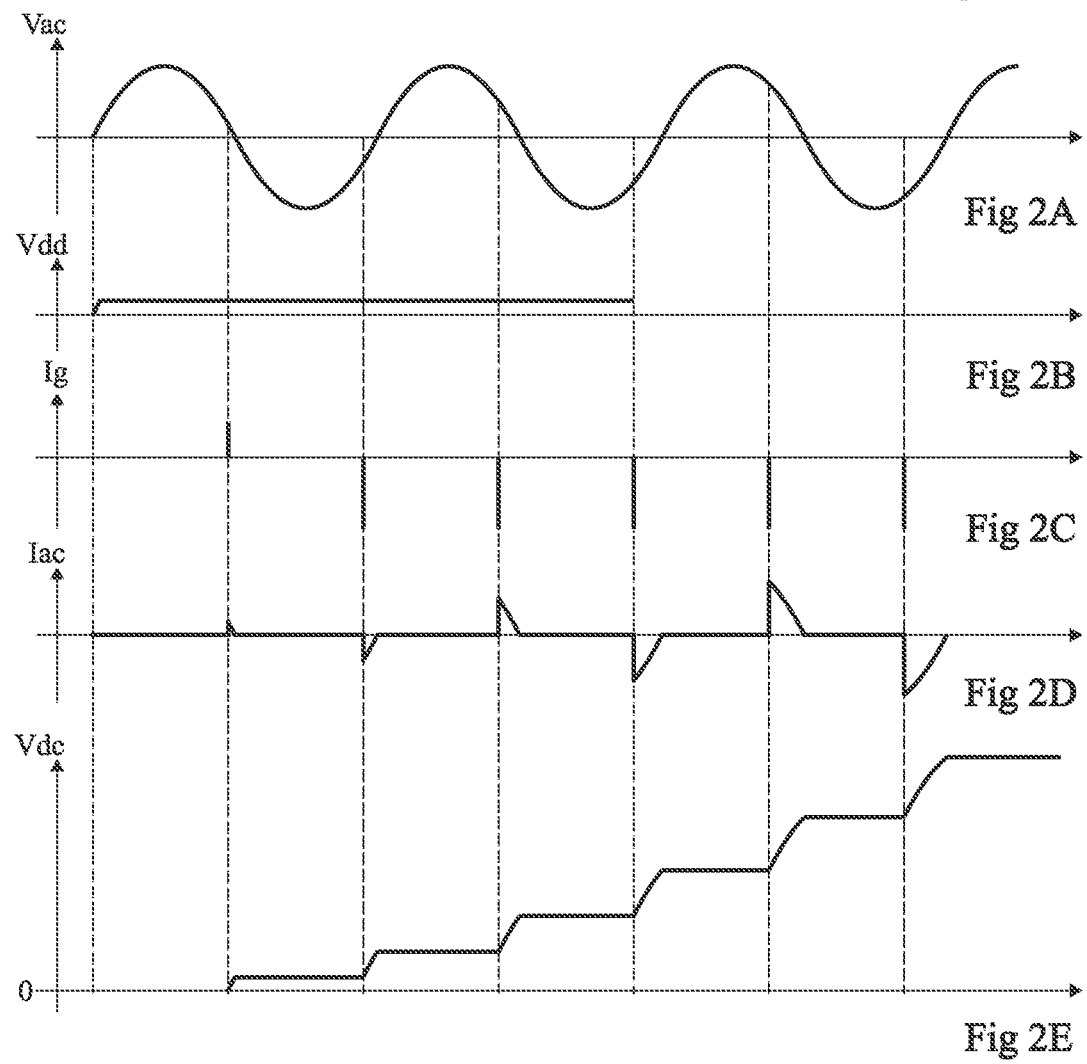

RECTIFYING BRIDGE CONTROL CIRCUIT

CROSS-REFERENCE TO RELATED APPLICATIONS

This application is a divisional of U.S. application patent Ser. No. 14/956,543 filed Dec. 2, 2015, which claims the priority benefit of French Application for U.S. Pat. No. 1,552,983, filed on Apr. 7, 2015, the contents of which are hereby incorporated by reference in their entireties to the maximum extent allowable by law.

TECHNICAL FIELD

The present disclosure generally relates to electronic devices and, more specifically, to alternating current to direct current (AC/DC) converters. The present disclosure generally applies to any system using a rectifying bridge, for example, circuits for controlling electric motors, electric chargers, switched-mode power supplies, etc.

BACKGROUND

Many AC/DC converter architectures based on rectifying elements, which may be controllable (thyristors, for example) or not (diodes, for example), assembled as a rectifying bridge, powered with an AC voltage and delivering a DC voltage, this DC voltage being possibly itself converted back into an AC voltage, are known.

The power consumption at stand-by, that is, the power consumption while the converter is powered with an AC voltage but no load extracts power from the output, is generally desired to be minimized.

Further, the inrush current, that is, the current peaks which occur for each halfwave of the AC voltage as long as the voltage across a capacitor at the output of the rectifying bridge has not reached a sufficient level and, this, particularly, in starting phases, is generally desired to be limited.

U.S. Pat. No. 5,715,154, United States Patent Application Publication No. 2002/0080630, and Japanese Publication No. JPS62135269 describe examples of AC/DC converters (all references incorporated by reference).

SUMMARY

An embodiment overcomes all or part of the disadvantages of usual power converter control circuits.

An embodiment provides a converter starting circuit solution where stand-by losses are decreased.

Thus, an embodiment provides an AC/DC converter comprising: a first terminal and a second terminal, intended to receive an AC voltage; a third terminal and a fourth terminal, intended to supply a first DC voltage; a rectifying bridge having input terminals respectively connected to the first and second terminals; and having either: output terminals respectively coupled by a controllable switching element to the third terminal and connected to the fourth terminal, or output terminals respectively connected to the third and fourth terminals, two controllable rectifying elements of the bridge respectively coupling the first and second terminals to the third terminal.

According to an embodiment, an electrode for controlling the switching element or electrodes for controlling the rectifying elements are coupled, by a first switch, to a terminal for supplying a positive potential and, by a second switch, to the fourth terminal.

According to an embodiment, the converter further comprises a circuit for supplying said positive potential, coupled by at least one diode to the first terminal.

According to an embodiment, the converter further comprises a microcontroller for controlling the first and second switches, powered from said positive potential.

According to an embodiment, the first switch is a PNP-type bipolar transistor or a P-channel MOS transistor, the second switch being an NPN-type bipolar transistor or an N-channel MOS transistor.

According to an embodiment, the switching element is a triac.

According to an embodiment, the switching element is a cathode-gate thyristor capable of being controlled by injection of current into the gate and by extraction of current from the gate.

According to an embodiment, the controllable switching elements are cathode-gate thyristors capable of being controlled by injection of current into the gate and by extraction of current from the gate.

An embodiment provides a method of controlling a converter, wherein the first switch injects a current into the gate of the switching element or of the rectifying elements in a first phase, after which the second switch extracts a gate current from the switching element or from the rectifying elements in a second phase.

According to an embodiment, in the second phase, the switching element or the rectifying elements are controlled in phase angle to limit the inrush current.

BRIEF DESCRIPTION OF THE DRAWINGS

The foregoing and other features and advantages will be discussed in detail in the following non-limiting description of specific embodiments in connection with the accompanying drawings, wherein:

FIG. 1 shows an embodiment of an AC/DC converter;

FIGS. 2A, 2B, 2C, 2D, and 2E illustrate, in timing diagrams, the operation of the converter of FIG. 1;

DETAILED DESCRIPTION

Figure 3:
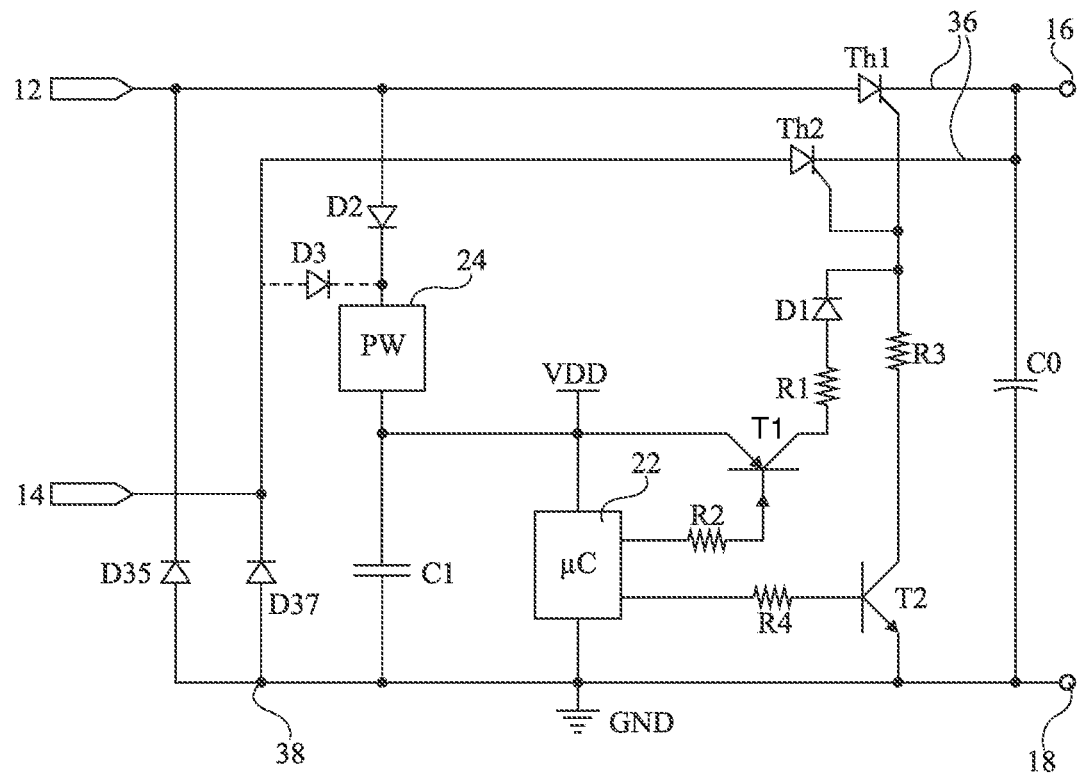
FIG. 3 shows another embodiment of an AC/DC converter.

The same elements have been designated with the same reference numerals in the different drawings. In particular, the structural and/or functional elements common to the different embodiments may be designated with the same reference numerals and may have identical structural, dimensional, and material properties. For clarity, only those steps and elements which are useful to the understanding of the described embodiments have been shown and will be detailed. In particular, the circuits powered by the power converter have not been detailed, the described embodiments being compatible with usual applications. In the disclosure, term "connected" designates a direct connection between two elements, while terms "coupled" and "linked" designate a connection between two elements which may be direct or via one or a plurality of other elements. When reference is made to terms "about", "approximately", or "in the order of", this means to within 10%, preferably to within 5%.

FIG. 1 schematically shows an embodiment of an AC/DC converter.

Two input terminals 12 and 14 are intended to receive an AC voltage Vac, for example, the voltage of the electric distribution network (for example, 230 or 120 volts, 50 or 60 Hz). Terminal 12 is connected to a first rectifying input terminal 32 of a rectifying bridge 3 (for example, fullwave) having its second rectifying input terminal 34 connected to terminal 14. A first rectified output terminal 36 of bridge 3 is coupled, via a switch, in this example, a triac T, to a first output terminal 16 supplying the high potential of a DC voltage Vdc. A second rectified output terminal 38 of bridge 3 is connected to a second output terminal 18 supplying the low potential of DC voltage Vdc. In the example of FIG. 1, terminals 38 and 18 define a reference potential (the ground) of the assembly, output voltage Vdc then being positive. A storage and smoothing capacitor C0 couples terminals 16 and 18.

Rectifying bridge 3 is, in this example, formed of four diodes D31, D33, D35, and D37. Diodes D31 and D33 respectively couple terminals 32 and 34 to terminal 36 (cathodes of diodes D31 and D33 on the side of terminal 36) and diodes D35 and D37 respectively couple terminals 32 and 34 to terminal 38 (anodes of diodes D35 and D37 on the side of terminal 38). Voltage Vr between terminals 36 and 38 corresponds to rectified and non-filtered voltage Vac.

Triac T has the function of controlling the output power supply. It is controlled in pulse mode, that is, a control circuit 2 applies a pulse on its gate for each halfwave of AC voltage Vac. Triac T then remains conductive until the current that it conducts disappears.

Control circuit 2 comprises a digital circuit 22, for example, a microcontroller (μC), in charge of generating control pulses of triac T. Microcontroller 22 receives different reference values CT or measurements to generate the pulses at the right times according, among others, to the needs of the load powered by the converter.

Microcontroller 22 is powered by bridge 3, that is, it is not necessary to provide an auxiliary circuit sampling the supply power directly from voltage Vac. In the shown example, a power supply circuit 24 (PW) is series-connected with a capacitive element C1, between terminals 36 and 38. Two terminals 222 and 224 for powering microcontroller 22 are connected across capacitor C1 delivering its power supply voltage Vdd. Circuit 24 has the function of regulating voltage Vdd so that it remains compatible with the power supply needs of the microcontroller. In practice, voltage Vdd is a low voltage as compared with voltages Vac, Vr, and Vdc. Typically, voltage Vdd is lower than 10 volts.

As an example, circuit 24 may be a switched-mode power supply. It is then formed of a MOS transistor controlled by an integrated circuit regulating voltage Vdd. Such a MOS transistor generally controls an inductance or a primary of a magnetic transformer.

Microcontroller 22 controls a first transistor T1 coupling terminal 222 (at potential Vdd) to the gate of triac T. In the example of FIG. 1, transistor T1 is a PNP-type bipolar transistor having its emitter connected to terminal 222 and having its collector coupled, via a diode D1 in series with an optional resistor R1, to the gate of triac T. The base of transistor T1 is coupled, optionally via a resistor R2, to a first output of microcontroller 22.

Microcontroller 22 also controls a second transistor T2 for controlling triac T. In the example of FIG. 1, transistor T2 is an NPN-type bipolar transistor having its emitter connected to ground 38 and having its collector connected, via a resistor R3, to the gate of triac T. The base of transistor T2 is coupled, optionally via a resistor R4, to a second output of microcontroller 22.

FIGS. 2A, 2B, 2C, 2D, and 2E are timing diagrams illustrating the operation of the converter of FIG. 1 at the start-up. FIG. 2A shows an example of the shape of voltage Vac. FIG. 2B shows the corresponding shape of voltage Vdd. FIG. 2C shows the shape of gate current Ig of triac T. FIG. 2D shows the shape of current Iac sampled from the AC power supply. FIG. 2E shows the corresponding shape of voltage Vdc.

Initially, capacitor C0 is discharged, as well as capacitor C1. Microcontroller 22 is thus not powered and triac T is off.

When AC power supply Vac is applied between terminals 12 and 14 (for example, via a power-on switch, not shown), capacitor C1 is charged by power supply block 24 until it reaches voltage Vdd required for the operation of microcontroller 22.

However, since capacitor C0 is discharged, no current can be drawn in the branch of transistor T2 to start triac T. A positive gate current should thus be applied to the triac to make it conductive and start charging capacitor C0. This is the function of transistor T1. At the end of a first halfwave of voltage Vac (or more generally at the end of a halfwave where the microcontroller is powered but where capacitor C0 is discharged), the microcontroller controls the turning-on of transistor T1 by drawing a base current onto it for a short time period (pulse for example lasting from 1 μs to approximately 1 ms). This causes the injection of a positive current Ig into the gate of triac T and the turning-on thereof until the end of the halfwave. Capacitor C0 is then charged during this halfwave end. To limit the inrush current, the turning-on of transistor T1, and thus of triac T, is caused in the vicinity of the end of the halfwave.

As soon as voltage Vdc across capacitor C0 is sufficient, microcontroller 22 controls, for each halfwave and in pulse mode, transistor T2 to draw current into the triac gate (negative gate current Ig) and cause the progressive charge of capacitor C0 (voltage Vdc progressively increasing from one halfwave to the next one).

To respect a soft start and limit current inrushes, microcontroller 22 controls transistor T2 in phase angle, that is, it starts turning on the triac in the decreasing portion of the halfwave and progressively sooner and sooner according to the charge level of capacitor C0. As soon as capacitor C0 is sufficiently charged, the triac can be controlled by a DC or pulse signal. In the case of a pulse control, the control is synchronized as well as possible with the time when the capacitor is to be recharged for each halfwave (that is, when voltage Vdc becomes lower than voltage Vac).

The number of cycles required to start the charge of capacitor C0 (number of conduction periods of transistor T1), and thus to wake up the system, as well as the number of cycles required for the starting (until capacitor C0 is charged) depends on the application and on the possible downstream power consumption at the start.

In practice, a single period is most often sufficient to sufficiently charge capacitor C0 to have a voltage sufficient to supply the gate current required to turn on the triac by controlling transistor T2. Transistor T1 is thus in this case only used once per converter start.

An advantage is that all the references of the power supplies and of the control signals are common (the ground).

Elements of optocoupler, transformer, or the like types are thus avoided, conversely, for example, to the solution of document JP 62135269.

Another advantage is that it is no longer necessary to use a resistive element to limit the inrush current at the starting of the converter, since triac T can be used in phase control from as soon as the first halfwave.

FIG. 3 shows another embodiment where triac T is replaced with two cathode-gate thyristors Th1 and Th2. Actually, this amounts to replacing diodes D31 and D33 of bridge 3 with thyristors Th1 and Th2 to integrate the control in the bridge. To allow the power supply of circuit 24, at least one diode D2 coupling terminal 12 to circuit 24 is then provided. In the example of FIG. 3, the power supply rectification of microcontroller 22 is halfwave, which is generally sufficient due to the low required power. As a variation, another diode (D3 in dotted lines in FIG. 3) coupling terminal 14 to circuit 24 is provided to perform a fullwave rectification.

The operation of the circuit of FIG. 3 can be deduced from the operation discussed in relation with FIG. 1. Thyristors Th1 and Th2 are however formed to be controlled both by a negative gate current and by a positive gate current. This amounts, in a way, to using a half-triac to keep the rectifying character of the thyristor.

Figure 4:
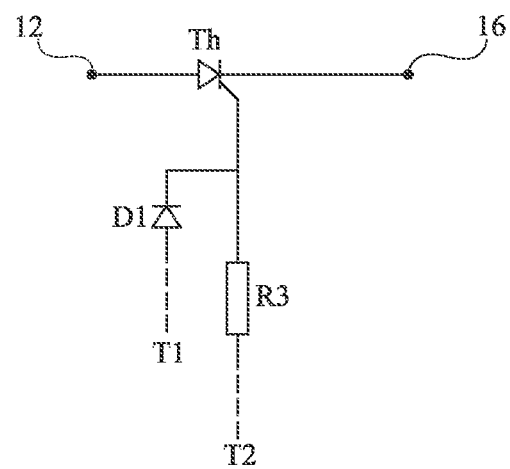
FIG. 4 shows a detail of another embodiment of an AC/DC converter.

FIG. 4 partially shows an embodiment of a converter. As compared with the assembly of FIG. 1, triac T is replaced with a thyristor Th. Indeed, the bidirectional character of the conduction of the triac is not used herein. What matters is to be able to control the switch placed between terminals 12 and 16 with a positive or negative gate current. As for the embodiment of FIG. 3, the cathode-gate thyristor should be able to be controlled by drawing a current onto its gate.

Figure 5:
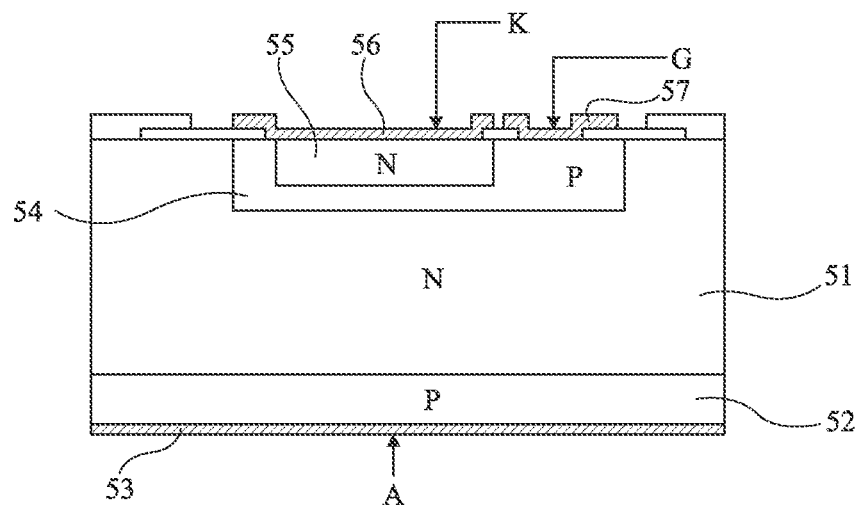
FIG. 5 is a simplified cross-section view of an embodiment of a cathode-gate thyristor having a positive gate current.
Figure 6:
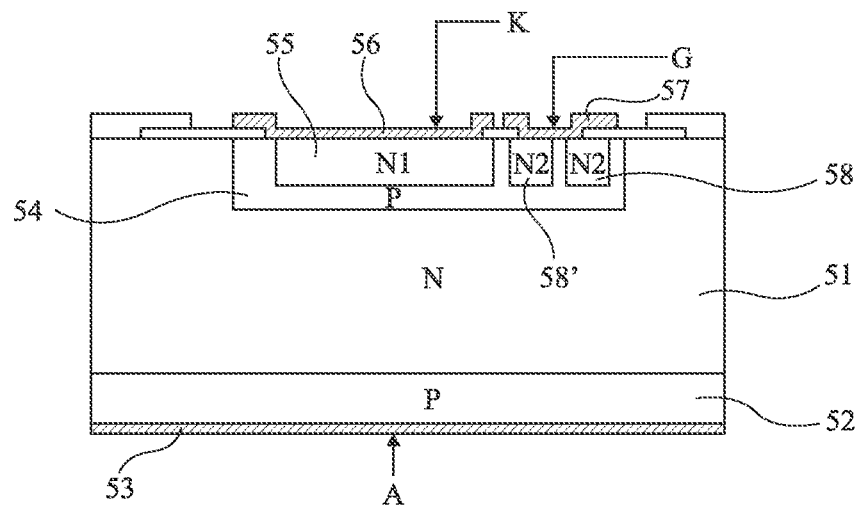
FIG. 6 is a simplified cross-section view of an embodiment of a cathode-gate thyristor having a negative gate current.

FIGS. 5 and 6 are simplified cross-section views of embodiments of cathode-gate thyristors respectively with a positive gate current or a current injection (most current case) and with a negative gate current or a current extraction.

According to these examples, the thyristor is formed in an N-type substrate 51. At the rear surface, a P-type layer 52 defines an anode region, anode electrode A being obtained by a contacting metallization 53 of region 52. A P-type well 54 is formed at the front surface. An N-type cathode region 55 (N1) is formed in well 54 and a contacting metallization 56 of this region 55 defines cathode electrode K.

In the case of FIG. 5, a gate contact 57 is formed at the level of P-type well 54. Thus, the injection of a gate current starts the thyristor if it is properly biased (positive anode-cathode voltage).

In the case of FIG. 6, an N-type region 58 (N2) is added under gate contact 57. Region 58 allows a turning-on by a negative gate current (that is, flowing from the gate to the cathode) by allowing an electron injection into N-type substrate 51, which corresponds to the base of the NPN-type bipolar transistor formed by regions 52-51-54.

Region N2 is divided into at least two regions 58 and 58' to allow a direct contact of region 54 on the gate. This embodiment, called "short-circuit hole", enables to improve the immunity to transient disturbances of the thyristor and the control by a positive gate current (that is, flowing from gate G to cathode K1). This embodiment thus enables the thyristor to be used to form thyristors Th1 and Th2 in the circuit of FIG. 3, or thyristor Th in FIG. 4.

Various embodiments have been described. Various alterations, modifications, and improvements will occur to those skilled in the art. For example, a current source may be used instead of resistor R3 to be sure of drawing a gate current from components T, Th1, Th2, and Th which remains approximately constant whatever the voltage across capacitor C. Further, the practical implementation of the described embodiments is within the abilities of those skilled in the art based on the functional indications given hereabove. In particular, the programming of the microcontroller depends on the application and the described embodiments are compatible with usual applications using a microcontroller or the like to control a converter. Further, the forming of a component acting as a normally-on switching element (triac) or rectifying element (thyristor), controllable to be turned on by a positive or negative pulse applied on a control electrode, is within the abilities of those skilled in the art based on the indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. An alternating current to direct current (AC/DC) converter, comprising:
   a first terminal and a second terminal configured to receive an AC voltage;
   a third terminal and a fourth terminal configured to supply a first DC voltage;
   a rectifying bridge having input terminals respectively connected to the first and second terminals, and further having output terminals coupled to the third and fourth terminals;
   wherein the rectifying bridge includes a first controllable rectifying element coupled between the first terminal and the third terminal, said first controllable rectifying element having a first control electrode;
   a first transistor switch that is selectively actuated to apply a positive potential at a power supply node to the first control electrode; and
   a second transistor switch that is selectively actuated to couple the first control electrode to the fourth terminal.

2. The converter of claim 1, wherein the first transistor switch, when selectively actuated injects a first current into the first control electrode to turn on the first controllable rectifying element, and wherein the second transistor switch, when selectively actuated, extracts a second current from the first control electrode to turn off the first controllable rectifying element.

3. The converter of claim 1, further comprising a circuit configured to supply said positive potential using at least one diode coupled between one of the first and second terminals and the power supply node.

4. The converter of claim 1, further comprising a microcontroller configured to control selective actuation of the first and second switches.

5. The converter of claim 1, wherein the microcontroller operates to actuate the first transistor switch in a start-up at an initial phase of AC voltage and then periodically actuate the second transistor switch for phases of the AC voltage following said initial phase.

6. The converter of claim 5, wherein the microcontroller operates to actuate the first transistor switch to inject the first current into the first control electrode of the first controllable rectifying element in a first phase, after which the microcontroller operates to actuate the second transistor switch to extract the second current from first control electrode of the first controllable rectifying element in a second phase.

7. The converter of claim 6, wherein, in the second phase, the first controllable rectifying element is controlled by the microcontroller in phase angle to limit inrush current.

8. The converter of claim 1, wherein the first transistor switch is one of a PNP-type bipolar transistor or a P-channel MOS transistor, and wherein the second transistor switch is one of an NPN-type bipolar transistor or an N-channel MOS transistor.

9. The converter of claim 1, wherein the first controllable rectifying element is a cathode-gate thyristor.

10. The converter of claim 1, wherein the rectifying bridge further includes a second controllable rectifying element coupled between the second terminal and the third terminal, said second controllable rectifying element having a second control electrode, wherein the first transistor switch further applies the positive potential at the first terminal to the second control electrode, and wherein the second transistor switch further couples the second control electrode to the fourth terminal.

11. The converter of claim 10, wherein the first and second controllable rectifying elements are cathode-gate thyristors.

12. An alternating current to direct current (AC/DC) converter, comprising:
 a first terminal and a second terminal configured to receive an AC voltage;
 a third terminal and a fourth terminal configured to supply a first DC voltage;
 a rectifying bridge comprising:
 a first diode coupled between the first terminal and the fourth terminal;
 a second diode coupled between the second terminal and the fourth terminal;
 a first controllable rectifying element coupled between the first terminal and the third terminal, said first controllable rectifying element having a first control electrode;
 a second controllable rectifying element coupled between the second terminal and the third terminal, said second controllable rectifying element having a second control electrode;
 a first transistor switch that is selectively actuated to apply a positive potential at a power supply node to the first and second control electrodes; and
 a second transistor switch that is selectively actuated to couple the first and second control electrodes to the fourth terminal.

13. The converter of claim 12, wherein the first transistor switch, when selectively actuated, injects a first current into the first and second control electrodes, and wherein the second transistor switch, when selectively actuated, extracts a second current from the first and second control electrodes.

14. The converter of claim 12, further comprising a circuit configured to supply said positive potential using at least one diode coupled between one of the first and second terminals and the power supply node.

15. The converter of claim 12, further comprising a microcontroller configured to control selective actuation of the first and second switches.

16. The converter of claim 12, wherein the microcontroller operates to actuate the first transistor switch in a start-up at an initial phase of AC voltage and then periodically actuate the second transistor switch for phases of the AC voltage following said initial phase.

17. The converter of claim 16, wherein, in a second phase following the initial phase, the first controllable rectifying element is controlled by the microcontroller in phase angle to limit inrush current.

18. The converter of claim 12, wherein the first transistor switch is one of a PNP-type bipolar transistor or a P-channel MOS transistor, and wherein the second transistor switch is one of an NPN-type bipolar transistor or an N-channel MOS transistor.

19. The converter of claim 12, wherein the first and second controllable rectifying elements are each a cathode-gate thyristor.

* * * * *